(12) United States Patent
Weng et al.

(10) Patent No.: US 9,007,261 B2
(45) Date of Patent: *Apr. 14, 2015

(54) METHOD AND APPARATUS FOR FAST TTFF (75) Inventors: Chin-Tang Weng, Kaohsiung (TW); Wei Guan Yau, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 121 days.

This patent is subject to a terminal disclaimer.

(21) Appl. No.: 13/101,158

(22) Filed: May 5, 2011

(65) Prior Publication Data
US 2011/0273327 A1   Nov. 10, 2011

Related U.S. Application Data (60) Provisional application No. 61/331,865, filed on May 6, 2010.

(51) Int. Cl.
G01S 19/27 (2010.01)
G01S 19/42 (2010.01)

(52) U.S. Cl.
CPC ..................................... G01S 19/27 (2013.01)

(58) Field of Classification Search
CPC ......... G01S 19/27; G01S 19/28; G01S 19/42; G01S 19/258
USPC ................. 342/357.2, 357.25, 357.4, 357.66; 701/468, 469
See application file for complete search history.

(56) References Cited

U.S. PATENT DOCUMENTS

| | | | |
|---|---|---|---|
| 5,828,336 A | 10/1998 | Yunck | |
| 5,935,196 A | 8/1999 | Brodie | |
| 6,424,890 B1 | 7/2002 | Syrjärinne | |
| 6,542,820 B2 | 4/2003 | LaMance | |
| 7,564,406 B2 | 7/2009 | Han | |
| 7,693,660 B2 | 4/2010 | van Diggelen | |
| 7,830,304 B2 | 11/2010 | Mattos | |
| 8,164,518 B2 | 4/2012 | Diggelen | |
| 8,212,719 B2 | 7/2012 | Van Diggelen | |
| 8,228,230 B1 | 7/2012 | Capozio | |
| 2006/0055598 A1 | 3/2006 | Garin | |
| 2007/0247354 A1 | 10/2007 | Garin | |
| 2008/0106463 A1 | 5/2008 | Diggelen | |
| 2008/0111738 A1 | 5/2008 | Han | |

(Continued)

FOREIGN PATENT DOCUMENTS

| | | |
|---|---|---|
| CN | 101387698 A | 3/2009 |
| CN | 101185008 B | 1/2011 |

(Continued)

OTHER PUBLICATIONS

International Search Report mailed on Aug. 11, 2011 for International application No. PCT/CN2011/073752, International filed: May 6, 2011.

(Continued)

Primary Examiner — Dao Phan (74) Attorney, Agent, or Firm — Winston Hsu; Scott Margo (57) ABSTRACT A data model containing orbital parameters is stored in a mobile device. When a First Fix is required by a GNSS system within the mobile device, these stored orbital parameters are used to rapidly generate accurate satellite trajectory data model. The stored orbital parameters may be modified in part or in whole as required by changing coefficients of the stored parameters.

5 Claims, 6 Drawing Sheets (56) References Cited

U.S. PATENT DOCUMENTS

| | | |
|---|---|---|
| 2008/0183384 A1 | 7/2008 | Gaal |
| 2008/0191936 A1 | 8/2008 | Phatak |
| 2009/0066565 A1 | 3/2009 | Tsai |
| 2009/0295630 A1 | 12/2009 | Wengler et al. |
| 2009/0303122 A1 | 12/2009 | Weng |
| 2010/0060518 A1 | 3/2010 | Bar-Sever et al. |
| 2010/0085247 A1 | 4/2010 | Venkatraman |
| 2010/0198512 A1 | 8/2010 | Zhang |
| 2010/0321236 A1 | 12/2010 | Diggelen |
| 2011/0273329 A1 | 11/2011 | Weng |

FOREIGN PATENT DOCUMENTS

| | | |
|---|---|---|
| CN | 101458318 B | 4/2011 |
| EP | 1 873 546 A1 | 1/2008 |
| EP | 1 953 561 A2 | 8/2008 |
| EP | 1 953 561 A3 | 8/2008 |
| JP | 2006525505 A | 11/2006 |
| JP | 2007292763 A | 11/2007 |
| JP | 20083092 A | 1/2008 |
| JP | 2008191158 A | 8/2008 |
| JP | 2010508524 A | 3/2010 |
| JP | 201147922 A | 3/2011 |
| JP | 2012502298 A | 1/2012 |
| TW | 200912672 | 3/2009 |
| TW | 201000938 | 1/2010 |
| WO | 2004099813 A1 | 11/2004 |
| WO | 2008055223 A2 | 5/2008 |
| WO | 2008055223 A3 | 5/2008 |
| WO | 2008100956 A1 | 8/2008 |
| WO | 2010047875 A2 | 4/2010 |

OTHER PUBLICATIONS

International Search Report mailed Aug. 18, 2011 for International application No. PCT/CN2011/073738, International filing date: May 6, 2011.

Paula Korvenoja et al., "Efficient Satellite Orbit Approximation", Sep. 19-22, 2000, pp. 1930-1937, ION GPS 2000, XP055063032, Salt Lake City, UT.

METHOD AND APPARATUS FOR FAST TTFF

CROSS-REFERENCES TO RELATED APPLICATIONS

This application claims the benefit of the filing date under 35 U.S.C. 119(e) of a U.S. Provisional Application No. 61/331,865, filed May 6, 2010, the disclosure of which is incorporated by reference herein in its entirety for all purposes.

BACKGROUND

The present application relates to GNSS (Global Navigation Satellite System) trajectory prediction.

Very precise knowledge of each of 3 or 4 GNSS satellites' clock and trajectory information is required to accurately calculate position of a remote receiver. The remote receiver can obtain this knowledge from the ephemeris information typically broadcasted repeatedly by each satellite every 30 seconds. However, due to many factors affecting the satellite's orbit, this broadcasted GNSS ephemeris information is typically only valid for 2 to 4 hours into the future.

Thus if a remote receiver has been unable to receive updated ephemeris information for an extended period, perhaps due to being turned off or disabled, any previously stored ephemeris information will be invalid when the remote receiver is reactivated, and updated information will be need to be retrieved from the satellites before the remote receiver can begin to calculate its current location. The delay in the remote receiver between being turned on and calculating current location is known as Time To First Fix (TTFF), and as any delay tends to frustrate a user, one of the most important tasks of a GNSS (e.g. GPS) is to speed up TTFF by extending or predicting the orbital ephemeris for the remote receiver.

One broad approach to this problem is for a server to collect ephemeris information and calculate extended satellite trajectory and clock information for many days into the future. Due to the complexity and required precision of orbital trajectory calculations, often using a perturbed Forced-model on received ephemeris information, the use of special software on a powerful central server is required to estimate extended trajectories for many days into the future while keeping estimations within acceptable error limits. Each time a remote receiver is reactivated, the remote receiver's TTFF can be shortened considerably by immediately receiving this extended information directly from the central server via an Internet or wireless communication system rather than waiting for the satellites to repeat their broadcast.

A second broad approach to the TTFF problem is for the server to continuously provide GNSS trajectory data that is valid for an extended period of time into the future on a mobile receiver. This solution requires the remote receiver to be in continuous or at least frequent connection with the server as well as adequate data storage capacity on the remote receiver.

SUMMARY

A position locating method for a Global Navigation Satellite System is disclosed. A model of a satellite's orbital and/or clock data is stored in the mobile device, the generated model including orbital parameters that are changeable or can be updated. To obtain a First Fix, the mobile device extracts satellite trajectory information from the stored orbital model and determines the satellite's position based on the extracted satellite trajectory information. Once the satellite's position is known, location of the mobile device can be determined.

A position locating method for a Global Navigation Satellite System is further disclosed which includes downloading at least a subframe of ephemeris data that includes specific satellite trajectory data and determining the satellite's position based on the extracted satellite trajectory information and the downloaded specific satellite trajectory data.

A mobile device used in a Global Navigation Satellite System is also disclosed. The mobile device includes a Global Navigation Satellite System module for determining location of the mobile device according to the Global Navigation Satellite System and a central processing unit coupled to the Global Navigation Satellite System module and to a memory. The memory comprises a model of a satellite's orbital and/or clock data including orbital parameters, where the parameters are changeable or can be updated, and computer code which when executed by the central processing unit extract satellite trajectory information from the orbital parameters stored in the memory, determines the satellite's position based on the extracted satellite trajectory information, and determines first fix of the mobile device according to the determined satellite's position and clock data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
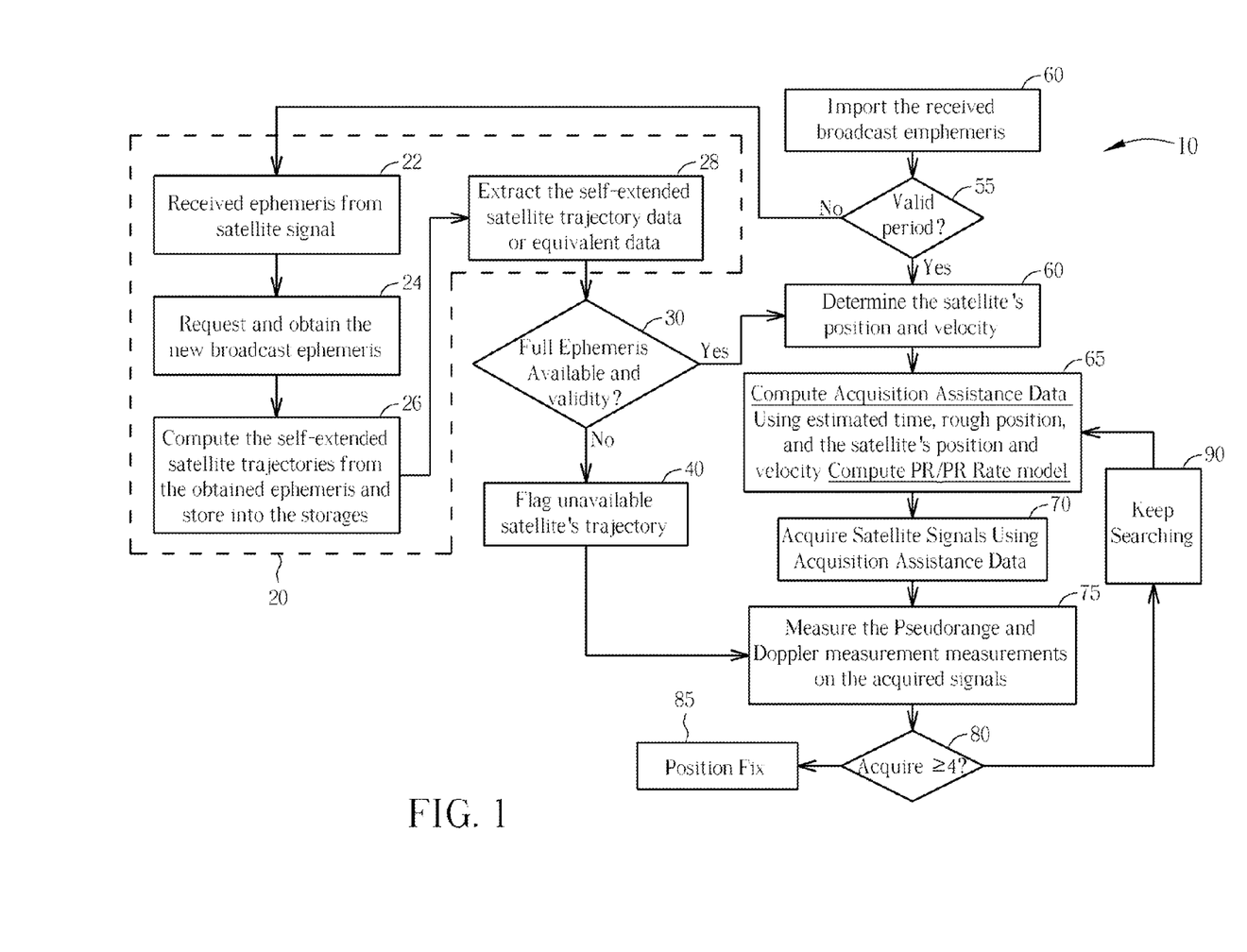
FIG. 1 is a general flow chart illustrating predicting trajectory data and using the self-extended trajectory data to acquire satellite signals.

Please refer to FIG. 1 which is a general flow chart 10 illustrating predicting trajectory data and using the self-extended trajectory data to acquire satellite signals according to an embodiment of the disclosure. In FIG. 1, the steps inside the dotted line 20, specifically steps 22, 24, 26, and 28, illustrate one method of extending orbital data for fast TTFF. As shown in step 60, ephemeris data can be imported into the system and checked for validity in step 55. If the data is valid, the flow jumps to step 60. If the data is no longer valid, the flow jumps to step 22. In steps 22 through 26, ephemeris data received from a satellite signal can be extended for short periods of time and stored into a memory. In step 28, the stored data can then be extracted and checked, in step 30, to ensure the full ephemeris is available and valid according the acceptable error tolerances. If the extracted data is not full and valid, a flag may be set in step 40 indicating the satellite's trajectory is unavailable. If the extracted data is full and valid, the flow jumps to steps 60, 65, 70, 75, 80, and 85 where finally a position can be fixed.

Figure 2:
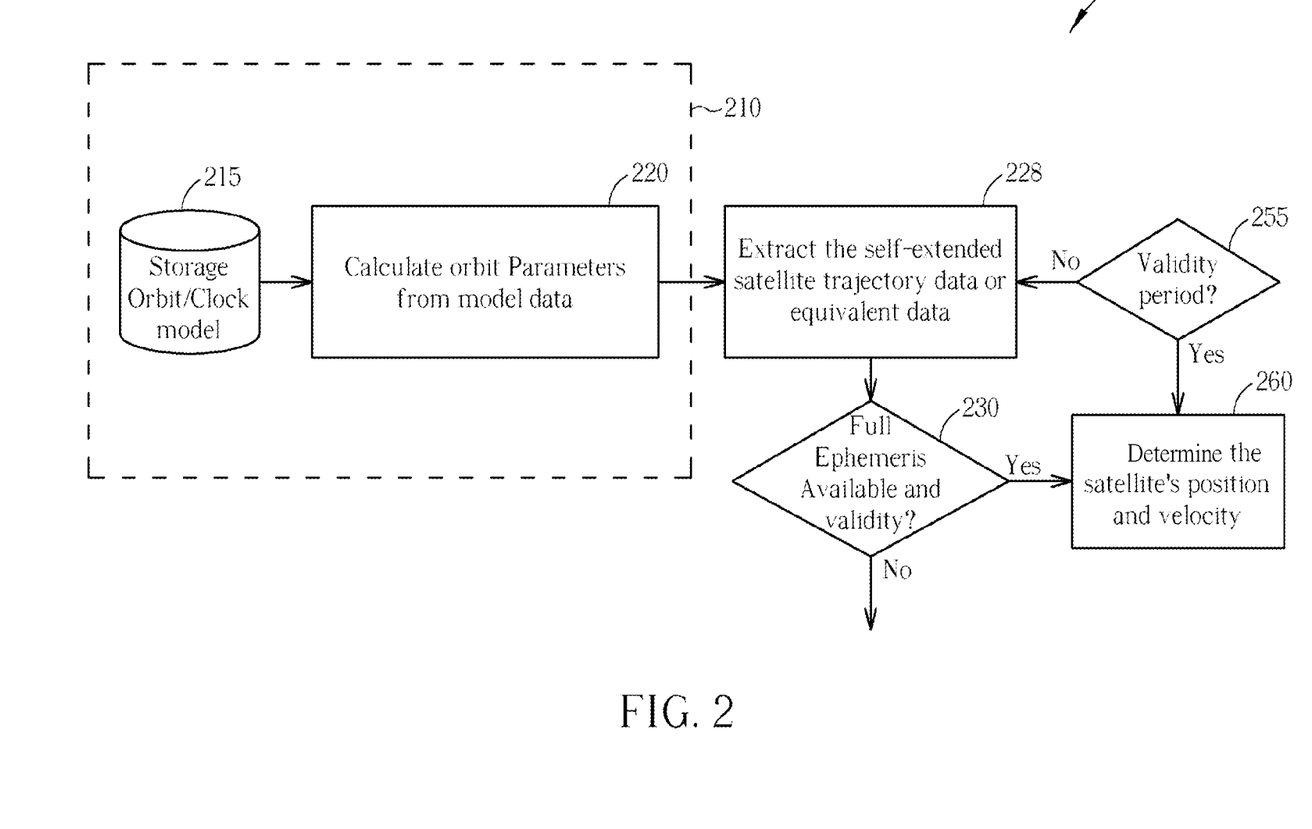
FIG. 2 is a flow chart illustrating predicting trajectory data according to one embodiment of the disclosure.

Please refer now to FIG. 2, which is a flow chart 200 illustrating trajectory data prediction according to one embodiment of the disclosure. In this embodiment, a storage orbit/clock model is pre-stored in the GNSS receiver, wherein the model includes a plurality of coefficients for calculating/predicting trajectory data. The model may be a function of time. When a position fix is required, corresponding timing information is substituted into the model and then an estimated satellite trajectory data is generated. Therefore, the ephemeris is no longer a necessary initial condition for position fix. The GNSS receiver can predict future trajectory data using the storage orbit/clock model without receiving ephemeris from satellite or external server. The storage orbit/clock model is established outside the GNSS receiver by, for example, analyzing ephemeris data for a predetermined period of time, perhaps even many months, for one or more of the GNSS satellites. Then the parameters capable of describing the trend of satellite trajectory are installed into the GNSS receiver as the storage orbit/clock model. This calculating model in step 215 can be of any type, inter alia a force model or numerical model, and can be used to obtain orbital and clock data at a future time point when desired. Because the data model is built by referring to a large amount of data using a powerful server and complicated software, the data model can be very accurate which is within acceptable error tolerances for weeks, months, or possible even more time into the future.

As one non-limiting example of such a data model, a satellite's orbital and/or clock data can be reduced to a polynomial of varying orders, each order having a coefficient. In practical application, one and/or more polynomials (or other data model) may be used to model the entire satellite's trajectory and/or each portion of the satellite's trajectory (for example Keplerian parameters or possibly X, Y, and Z parameters either of which can be used, and the present invention is not limited thereto). A majority of the coefficients are temporarily fixed (although changeable in some embodiments) to provide accurate representation of the orbital and clock data for that satellite. Once an acceptable data model has been generated, orbital parameters can be calculated directly from the data model as shown in step 220. These orbital parameters form the basis for polynomial (or other applied calculation method) data model including the appropriate coefficients. In this example, replacing or altering coefficients of one or more predefined orders of the polynomial can, when solved, produce reasonably accurate orbital and/or clock data for that satellite at the time represented by the correspondingly replaced/modified coefficient(s).

Once a mobile device that has GNSS capabilities and also has the orbital parameters stored within the mobile device requires a First Fix, appropriate coefficients, such as current time perhaps, are applied to the orbital parameters as shown in step 228. This application of the appropriate coefficients results in the extraction of satellite trajectory data as predicted by the orbital parameters without the necessity of accessing a host system or satellite signal to obtain the information. The extracted satellite trajectory data is then checked, in step 230, to ensure that it forms the equivalent of full ephemeris data and that the extracted data is still considered valid. The validity of the data is subject to acceptable error tolerances, type of data model used in step 215 utilized and other design considerations.

If the extracted data is both considered complete and valid, the satellite's position and velocity (step 260) can be determined using the extracted data without waiting to receive ephemeris data from a host system or a satellite signal, greatly improving TTFF. Because the orbital parameters can be calculated using much historical data and powerful software with few time constraints, the accuracy and validity of satellite trajectory data extracted from the stored orbital parameters can be greatly improved over conventional methods.

Figure 3:
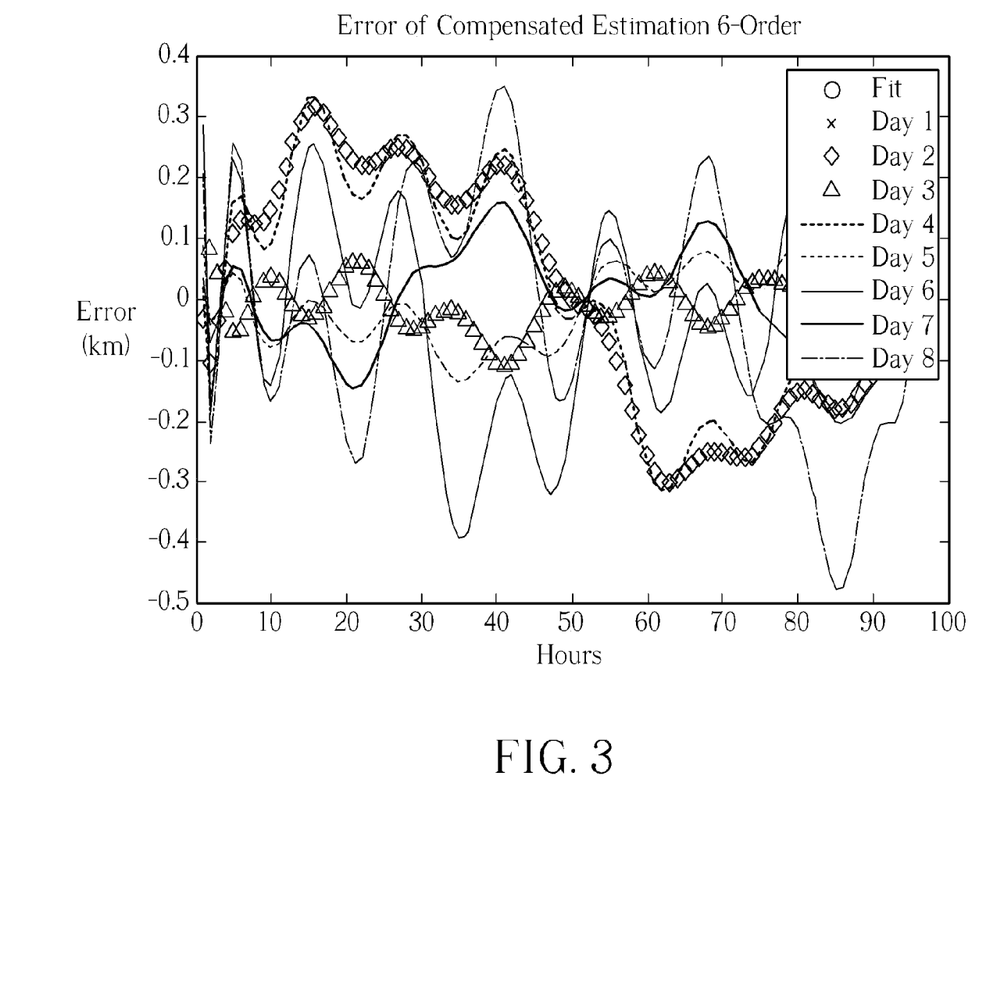
FIG. 3 is an example graph illustrating compensated error correction according to one embodiment of the disclosure.

FIG. 3 illustrates a simple example of such extracted satellite trajectory data. In FIG. 3, the orbital parameters for a six-order polynomial is used.

As can be seen, data extracted from the orbital parameters in this example due produce errors on the order of 100 meters, but errors at this level are well within acceptable tolerances. With a longer collection of ephemeris data and higher order orbital parameters which is easily possible when generated in step 215, accuracy and valid durations of the extracted data can be further improved.

Please be noted that the orbital/clock model may include a reference ephemeris or almanac and a plurality of coefficients describing error correction terms referring to the specific reference ephemeris or almanac. In other words, satellites' reference ephemeris and an error model may be pre-stored in the mobile device. When a position fix is required, corresponding timing information is substituted into the model to calculate an estimated error, and then an estimated satellite trajectory data is generated by combining the estimated error with the reference ephemeris/almanac. Therefore, the ephemeris is no longer a necessary initial condition for position fix. The GNSS receiver can predict future trajectory data using the storage model without receiving ephemeris from satellite or external server.

With reduction in error and increased extendibility in mind, the following embodiments may each include the ability to modify the orbital parameters stored within the mobile device to compensate for errors.

Because orbits and clocks are changed by authorities, seasonal variations in orbits, and many other factors, even the best orbital parameters may need adjustment from time to time. Thus the following embodiments each may include the ability to modify the stored orbital parameters, preferably by updating coefficients(s). These new updating coefficients may be obtained by a connection to an appropriate sever or the mobile device may be capable of updating the coefficients themselves. This self updating of the coefficients could be accomplished by calculating differences between a newly downloaded ephemeris and data extracted from the stored orbital parameters. Program code and/or calculation rules also stored in the mobile device could be used to periodically update the coefficients accordingly without having to reprocess the entire data model 215 shown in FIG. 2.

It is also possible that only one or some of the coefficients new updating. For example, suppose XYZ parameters are utilized and after a time it is noticed that while both of the X and Y parameters remain within error tolerances, the Z parameter is registering outside of acceptable tolerances. In this situation, the stored orbital parameter could be corrected, via replacement or modification to return the extracted Z parameter back within acceptable error limits. This could be accomplished in a number of ways, but simply changing the appropriate coefficient(s) that affect the Z parameter may be possible. If this corrective action is chosen, the new coefficient(s) could be obtained over the Internet or via a wireless connection, especially when a change in orbit for a given satellite has been enacted, or the mobile device may be capable or tracking such an error and taking corrective action by itself by modifying the orbital parameters according to predefined rules or calculations. While a person with ordinary skill in the art can readily appreciate that the above-mentioned XYZ parameters presented in Cartesian coordinate system can be extended to Keplerian parameters presented in celestial coordinate system or any other coordinate systems, further descriptions are omitted for brevity.

Figure 4:
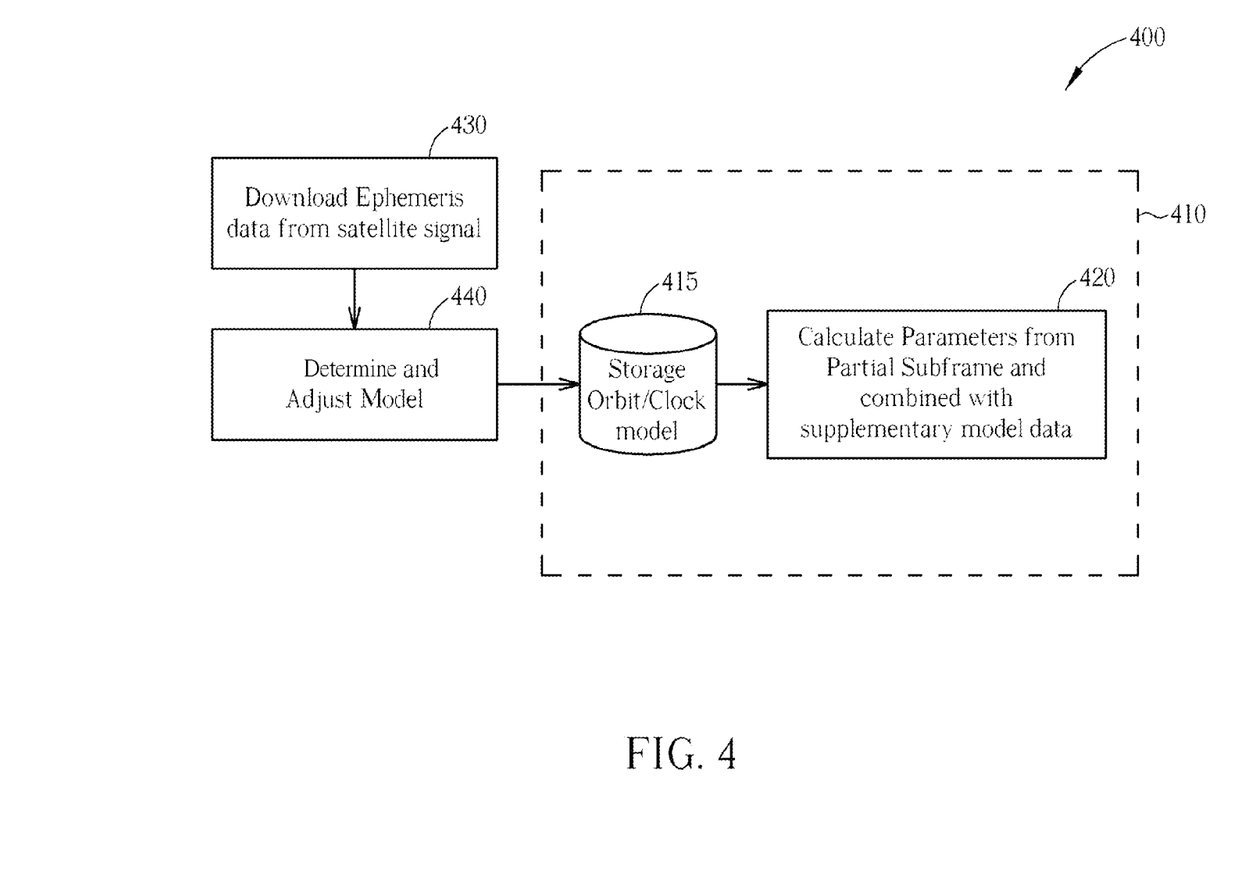
FIG. 4 is a flow chart illustrating predicting trajectory data according to one embodiment of the disclosure.

Please refer now to FIG. 4, which shows a flow chart 400 of one embodiment which is capable of adjusting the stored orbital parameters. Although most of the data extracted from one or more of the orbital parameters may remain valid, it may be possible for one or more of the extracted data to fall outside defined error tolerances. For example, suppose that the clock in a given satellite has been changed by authorities. The extracted data would then not match the changed clock, and precise location information could no longer be obtained. In this embodiment, current ephemeris data is downloaded from a satellite signal (step 430) to obtain the correct clock for that satellite. Or in another example, perhaps the clock is known but one of the coordinates is no longer valid. The downloaded ephemeris signal would also provide the needed coordinate. In these examples, the needed information (step 440) obtained from the downloaded ephemeris is merged with the valid data extracted from the orbital parameters (step 415) and the combination is used to calculate positional information of the mobile device (step 420).

This embodiment where partial ephemeris data supplements the stored orbital parameters provides the advantage that under most circumstances, the mobile device would not have to receive the entire broadcasted ephemeris to generate the First Fix. As is known, the entire broadcasted ephemeris is made up of a series of independent frames, each frame containing specific information and taking about 6 seconds to receive. Thus to receive the entire ephemeris normally delays First Fix about 30 or more seconds. However, as in this embodiment only a specific piece of information is required, as soon as the frame that contains that specific piece of information is received, the mobile device can immediately return to generating the First Fix without waiting to receive the remainder of the broadcasted ephemeris, saving 15 seconds or to for TTFF on the average and possibly as much as 25 seconds, a vast improvement from the viewpoint of the user.

Figure 5:
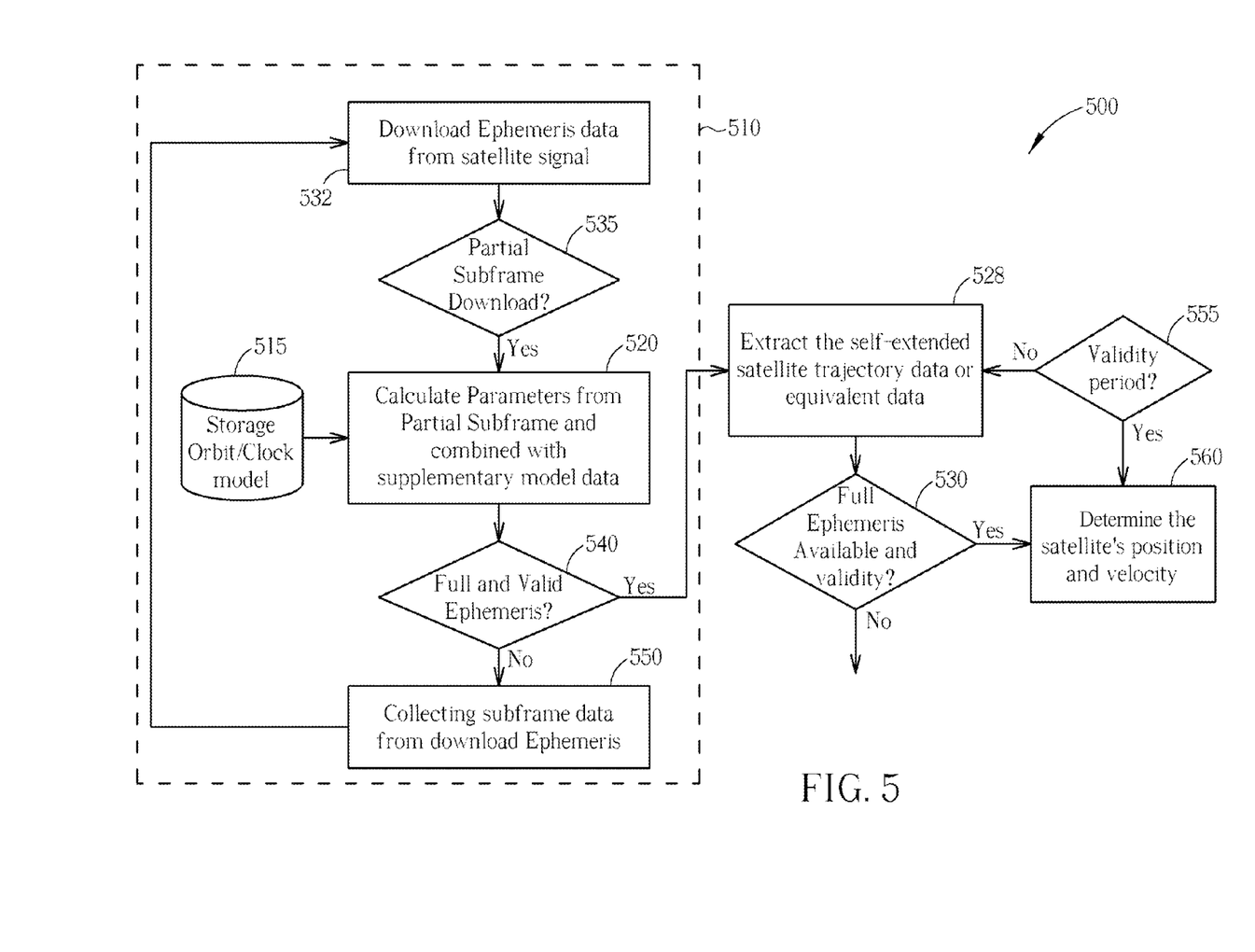
FIG. 5 is a flow chart illustrating predicting trajectory data according to one embodiment of the disclosure.

FIG. 5 illustrates a flow chart 500 of a partial subframe of broadcasted ephemeris data being used to supplement data (510) extracted from the stored orbital parameters (step 515). In FIG. 5, current ephemeris data is downloaded from a satellite in step 532. The mobile device then checks (step 535) if the already received partial subframe contains the specific data that is needed. If so, step 520 calculates orbital data from the specific data in the partial subframe and the stored orbital parameters. The calculated data is then checked for completeness and validity. If the calculated data is not both complete and valid, then step 550 returns to step 532 where the next partial subframe of ephemeris data is received. If the calculated data is both complete and valid, the step 528 extracts the self-extended data from the downloaded data and orbital parameters combined in step 520. The self-extended data is again checked for completeness and validity, and if both conditions are true, step 560 uses the complete and valid data to determine the satellite's position, which is in turn used to determine the location of the mobile device. Step 555 may be considered sort of an entry point into the flow chart 500, where if the self extracted data is valid, positions can be immediately determined. However, if the current self-extracted data is not valid, new self-extracted data is obtained from step 528. In one embodiment, the subframe comprises a navigation message subframe, as defined in Interface Control Document (ex., ICD-GPS-200, Glonass ICD, Galileo OS SIS ICD, or QZSS ICD, . . . etc.).

Figure 6:
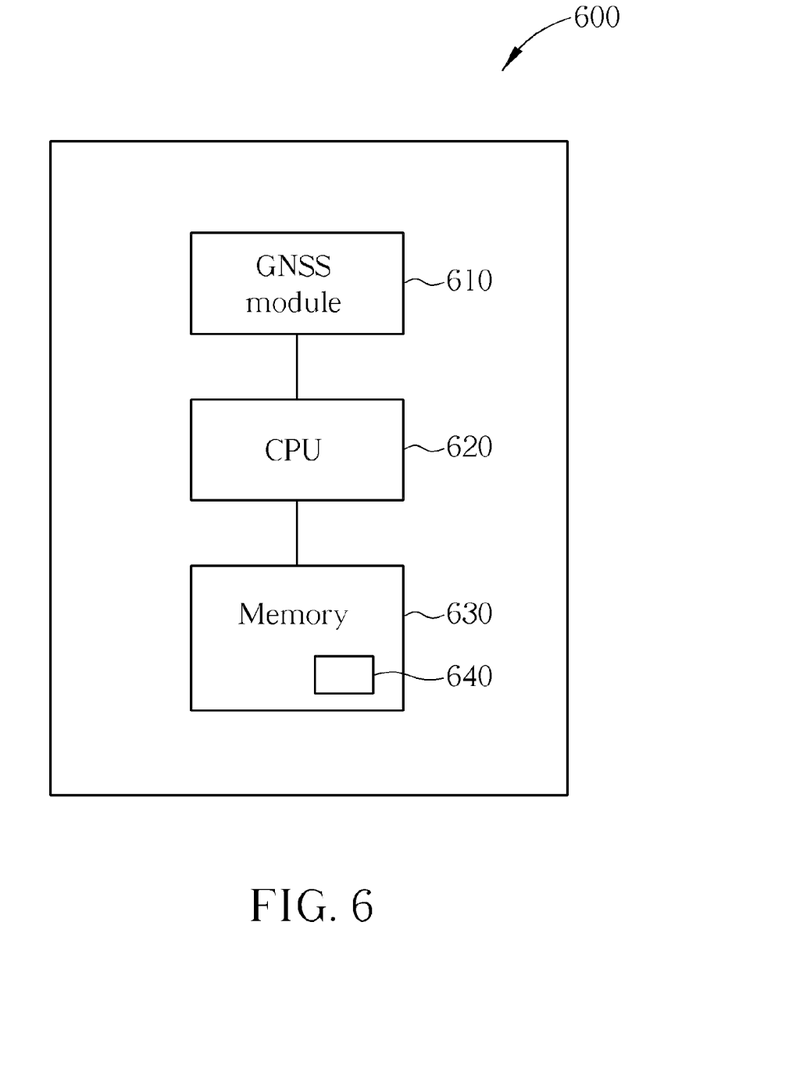
FIG. 6 is an example GNSS enabled device for use with the embodiments detailed in the disclosure.

FIG. 6 is an example GNSS device 600 suitable for use with embodiments disclosed herein. The device 600 includes a GNSS module 610 for determining satellite and/or mobile device location. Coupled to the GNSS module 610 is a central processing unit 620 for controlling the mobile device 600 and for executing computer code 640 stored in the memory 630. The stored computer code 640 may include the generated model including orbital parameters, as well as computer code specific to each of the embodiments detailed herein.

In summary, an improved method of TTFF is disclosed. A data model is built, allowing generation of orbital data without receiving broadcasted ephemeris for position fix. The data model containing changeable parameters are stored in a mobile device. When a position Fix is required by a GNSS system within the mobile device, these stored orbital parameters are used to rapidly generate accurate satellite trajectory data model without requiring access to a broadcasted ephemeris or a network connection, speeding up TTFF while providing extended validity periods.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile device used in a Global Navigation Satellite System, the device comprising:
    a Global Navigation Satellite System module for determining location of the mobile device according to the Global Navigation Satellite System;
    a processing unit coupled to the Global Navigation Satellite System module and to a memory, the memory comprising:
        a model of a satellite's orbital and/or clock data including orbital parameters; and
        computer code which when executed by the processing unit updates at least one of coefficients of the model, extract satellite trajectory information from the orbital parameters stored in the memory, determines the satellite's position based on the extracted satellite trajectory information, and determines position of the mobile device according to the determined satellite's position;
        wherein the memory further comprises computer code which when executed by the processing unit downloads at least a subframe of ephemeris data that includes specific satellite trajectory data and determines the satellite's position based on the extracted satellite trajectory information and the downloaded specific satellite trajectory data.

2. A position locating method for a Global Navigation Satellite System, the method comprising:
    storing a model of a satellite's orbital and/or clock data in a memory of a mobile device, the model including orbital parameters;
    extracting satellite trajectory information from the stored orbital parameters stored in the memory;
    downloading at least a subframe of ephemeris data that includes specific satellite trajectory data;
    determining the satellite's position based on the extracted satellite trajectory information and the downloaded specific satellite trajectory data; and
    determining position of the mobile device according to the determined satellite's position.

3. The method of claim 2 wherein the subframe comprises a navigation message subframe.

4. A mobile device used in a Global Navigation Satellite System, the device comprising:

a Global Navigation Satellite System module for determining location of the mobile device according to the Global Navigation Satellite System;

a processing unit coupled to the Global Navigation Satellite System module and to a memory, the memory comprising:

a model of a satellite's orbital and/or clock data including orbital parameters; and computer code which when executed by the processing unit extract satellite trajectory information from the orbital parameters stored in the memory, downloads at least a subframe of ephemeris data that includes specific satellite trajectory data, determines the satellite's position based on the extracted satellite trajectory information and the downloaded specific satellite trajectory data, and determines position of the mobile device according to the determined satellite's position.

5. The mobile device of claim 4 wherein the subframe comprises a navigation message subframe.

* * * * *